United States Patent
Seok

(10) Patent No.: US 9,264,981 B2
(45) Date of Patent: Feb. 16, 2016

(54) SCANNING METHOD IN WIRELESS SYSTEM

(75) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 645 days.

(21) Appl. No.: 12/922,276

(22) PCT Filed: Mar. 10, 2009

(86) PCT No.: PCT/KR2009/001188
§ 371 (c)(1),
(2), (4) Date: Sep. 13, 2010

(87) PCT Pub. No.: WO2009/113798
PCT Pub. Date: Sep. 17, 2009

(65) Prior Publication Data
US 2011/0019653 A1  Jan. 27, 2011

(30) Foreign Application Priority Data
Mar. 14, 2008  (KR) .................. 10-2008-0023584

(51) Int. Cl.
*H04W 4/00* (2009.01)
*H04W 48/16* (2009.01)
*H04W 48/20* (2009.01)
*H04W 84/12* (2009.01)

(52) U.S. Cl.
CPC .............. *H04W 48/16* (2013.01); *H04W 48/20* (2013.01); *H04W 84/12* (2013.01)

(58) Field of Classification Search
CPC ...... H04W 48/16; H04W 48/20; H04W 84/12
USPC ........................ 370/338, 310, 315; 455/3.04
See application file for complete search history.

(56) References Cited

U.S. PATENT DOCUMENTS

| | | | | |
|---|---|---|---|---|
| 7,260,620 | B1 * | 8/2007 | Halasz | 709/220 |
| 7,580,393 | B2 * | 8/2009 | Wang et al. | 370/332 |
| 8,051,463 | B2 * | 11/2011 | Thawani et al. | 726/3 |
| 8,131,291 | B2 * | 3/2012 | Jeong et al. | 455/434 |
| 2005/0068928 | A1 | 3/2005 | Smith et al. | |
| 2005/0232200 | A1 * | 10/2005 | Jeong et al. | 370/331 |
| 2006/0039360 | A1 * | 2/2006 | Thawani et al. | 370/352 |
| 2006/0111103 | A1 * | 5/2006 | Jeong et al. | 455/434 |

(Continued)

OTHER PUBLICATIONS

IEEE P802.11 Wireless LANs "Network Type Selection" Apr. 30, 2004; Matthe Gast.*

*Primary Examiner* — Phuc Tran
(74) *Attorney, Agent, or Firm* — Birch, Stewart, Kolasch & Birch, LLP

(57) ABSTRACT

A scanning method in a wireless local area network (WLAN), a station supporting the scanning method, and a new type of interworking information element format including information about a distribution system (DS) are disclosed. In the scanning method, information about a DS is included in a beacon frame or a probe request frame/frame response frame. Such information about the DS may be included in a network type field of, for example, an interworking information element. In an active scanning method, a user equipment (UE) may specify its DS type by transmitting a probe request frame including DS information such as the DS type or the like. In a passive scanning method, the UE may select a suitable AP by using DS information such as a DS type included in the beacon frame or the like. The DS type may be information indicating whether a DS is a wireless network such as a mesh network or any other wired network.

8 Claims, 2 Drawing Sheets

(56) References Cited

U.S. PATENT DOCUMENTS

| | | |
|---|---|---|
| 2006/0153133 A1 | 7/2006 | Zhong |
| 2007/0093201 A1* | 4/2007 | Hsu et al. ................... 455/3.04 |
| 2007/0147317 A1 | 6/2007 | Smith et al. |
| 2008/0080388 A1* | 4/2008 | Dean et al. ................... 370/252 |
| 2008/0298333 A1* | 12/2008 | Seok ............................. 370/338 |
| 2010/0091669 A1* | 4/2010 | Liu et al. ...................... 370/252 |
| 2010/0323682 A1* | 12/2010 | Hatayama et al. ......... 455/422.1 |
| 2011/0222424 A1* | 9/2011 | Abhishek et al. ............ 370/252 |
| 2012/0314663 A1* | 12/2012 | Dwivedi et al. .............. 370/329 |
| 2014/0064128 A1* | 3/2014 | Park et al. .................... 370/252 |

* cited by examiner

SCANNING METHOD IN WIRELESS SYSTEM

TECHNICAL FIELD

The present invention relates to a wireless local access network (WLAN) and, more particularly, to a scanning method in a WLAN, a station supporting the scanning method, and a new type of data format therefor.

BACKGROUND ART

Recently, diverse wireless communication technologies are under development in line with the advancement of information communication technology. Among them, a wireless local area network (WLAN) is a technique allowing mobile terminals such as personal digital assistants (PDAs), lap top computers, portable multimedia players (PMPs), and the like, to wirelessly access the Internet in particular service providing areas such as homes, offices, or aircraft based on a radio frequency technology.

The early WLAN technique supported the rate of 1~2 Mbps through frequency hopping, spread spectrum, infrared communication, and the like, by using a 2.4 GHz frequency based on IEEE 802.11. Recently, the advancement of wireless communication technology allows supporting of a maximum rate of 54 Mbps by applying orthogonal frequency division multiplex (OFDM) technology and the like to the WLAN. Further, IEEE 802 has developed a wireless communication technique for improving quality of service (QoS), allowing compatibility of access point (AP) protocols, achieving security enhancement, making radio measurement or radio resource measurement, allowing wireless access in vehicular environment, ensuring fast roaming, establishing a mesh network, performing inter-working with external network, performing wireless network management, and the like, and put those techniques into practical use, or are still developing them.

In the WLAN system, a user equipment (UE), a non-AP station performs a scanning method to search for an accessible AP. The scanning method is a method for acquiring a list of candidate APs to be combined in a combining method, a follow-up method, and information about each AP.

The scanning method includes two types of method. A first scanning method is a passive scanning method which uses a beacon frame transmitted from an AP. In this method, a UE, which wants to become a member of a particular extended service set (ESS), receives beacon frames the APs periodically transmit to acquire a list of candidate APs transmitting beacon frames including the same service set ID (SSID) as the ID of the ESS to be connected and information about each candidate AP.

The second method is an active scanning method. In this method, a UE, which wants to become a member of a particular ESS, first transmits a probe request frame. The probe request frame includes an SSID to be connected. Respective APs receive the probe request frame, and if the APs have the same SSID as that included in the received probe request frame, they transmit a probe response frame to the UE. Accordingly, the UE can acquire a list of candidate APs based on the received probe response frames.

If, however, the UE is located in a hotspot, a list of candidate APs that can be acquired through the scanning method is so huge that overhead of the UE gradually increases in the scanning method. For example, in the passive scanning method, the number of scanned beacon frames including the same SSID as received is considerably increased to cause overhead. Also, in the active scanning method, the number of probe response frames with respect to the transmitted probe request frame is drastically increased, increasing overhead with respect to the scanning method as much.

However, with all the possibility of increasing overhead with respect to the scanning methods, information provided by the current scanning methods falls short of providing sufficient information regarding a network to be connected by the UE. In particular, with types of distribution systems (DSs) diversified, when the UE desires to access an external network, not the WLAN, to use services provided therefrom, the UE needs sufficient information about the access network (AN), but the current scanning methods fail to meet the need for the information about such DSs or AN.

DISCLOSURE OF INVENTION

Technical Problem

Therefore, an object of the present invention is to provide a scanning method in a wireless local area network (WLAN) capable of sufficiently acquiring information about a distribution system (DS) or an access network (AN) that helps select an access point (AP) to be accessed by a user equipment (UE) among a plurality of candidate APs, and a station supporting the scanning method.

Another object of the present invention is to provide a scanning method in a WLAN capable of sufficiently acquiring information about a DS or an AN to allow a WLAN UE to effectively use a service provided from an external network, and a station supporting the scanning method.

Technical Solution

In one aspect of the present invention, there is provided a scanning method in a WLAN, including: acquiring information about a DS to which APs of an ESS that a station wants to access are connected, respectively; and selecting an AP to be connected from among the APs by using the acquired information about the DS.

The information about the DS may be included in a beacon frame, or may be included in at least one of a probe request frame and a probe response frame. In this case, the information about the DS may be included in a network type field of an interworking information element. Also, the information about the DS may be information indicating whether the DS is a wired network or a wireless network.

In another aspect of the present invention, there is provided a UE (non-AP STA) or an AP supporting such scanning method in the WLAN. The UE may specify or acquire information about a DS to which an AP is connected in the scanning method, or the AP provides the information about the DS to which the AP itself is connected.

In still another aspect of the present invention, a format of a frame for a scanning method in a WLAN is provided. The frame may be a beacon frame, a probe request frame or a probe response frame, and the frame may include information about a DS. In this case, the information about the DS may be included in a network type field of an interworking information element of the beacon frame, the probe request frame or the probe response frame. The information about the DS may be distribution system type information indicating whether the DS is a wired network or a wireless network.

Advantageous Effects

With information acquired or requested by a UE according to the related art scanning methods, the UE cannot acquire nor specify information about a DS to which an AP is connected. For example, when there are several APs that the UE can access, the UE cannot specify information about a DS to which the APs are connected or cannot recognize the information by using a received frame. That is, because the UE cannot recognize whether a corresponding AP is a mesh AP (MAP) or an AP connected to a wired network, it inevitably accesses an arbitrary AP. However, according to embodiments of the present invention, the UE can specify in advance information about a DS to which an AP to access by the UE itself in the scanning method or may be selectively associated to an AP connected to a type of DS. Thus, the UE can select more suitable AP by using the information about the DS to which the AP is connected.

MODE FOR THE INVENTION

A management method in a wireless communication system and a device supporting the method according to exemplary embodiments of the present invention will now be described in detail with reference to the accompanying drawings. In the embodiments described hereinafter, a wireless local area network (WLAN) system among wireless communication systems will be taken as an example, which is, however, merely illustrative. The embodiments of the present invention may be applicable in the same manner to any other wireless communication systems than the WLAN system, except for a case not allowed in its nature. In this case, the terms or words unique to the WLAN system used in the embodiments of the present invention may be suitably modified into other terms or words commonly used in a corresponding wireless communication system.

Figure 1:
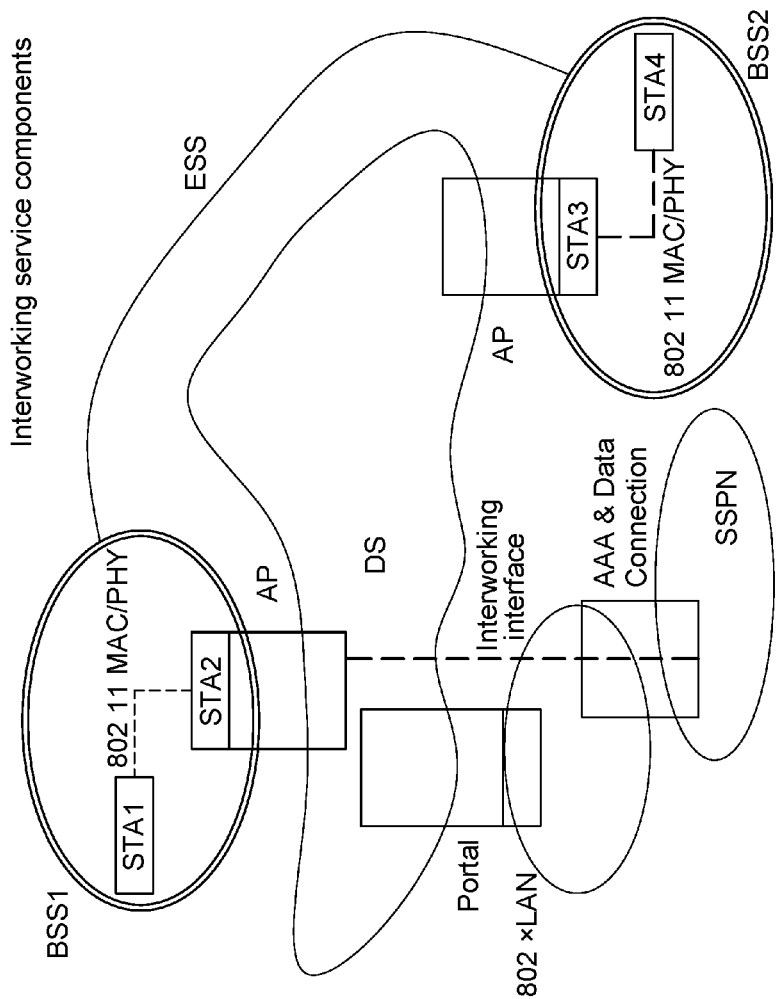
FIG. 1 is a diagram illustrating an IEEE 802.11 interworking architecture including a wireless local area network (WLAN) system that can employ a scanning method according to an embodiment of the present invention.

FIG. 1 is a diagram illustrating an IEEE 802.11 interworking architecture including a wireless local area network (WLAN) system that can employ a scanning method according to an embodiment of the present invention. An interworking service is defined by IEEE 802.11u. A primary purpose of the interworking service is allowing information transmission from an external network, helping select a network, and enabling an urgent service, and the IEEE 802.11u standards define general protocols therefor, e.g., an interworking interface. Such interworking service allows a UE, a non-AP STA, to access a service provided by the external network according to a subscription of the external network or other characteristics.

With reference to FIG. 1, interworking-available (interwork-capable) AP of a WLAN system can interwork with the external network by using a logical interworking interface. In FIG. 1, the external network is symbolically represented as a subscription service provider network (SSPN), whose substantial construction, however, has no connection with the embodiments of the present invention. The external network has an AAA (Authentication, Authorization, and Accounting) and data connection with APs via an interworking interface. The interworking interface transparently passes through a portal and a 802.xLAN.

The WLAN system includes one or more basic service sets (BSSs). The BSS is a set of stations (STA) which are successfully synchronized with each other for communications, not a concept indicating a particular area. The BSS may be classified into an infrastructure BSS and an independent BSS (IBSS). The infrastructure BSSs (BSS1 and BSS2) each include one or more STAs, an AP, i.e., an STA providing a distribution service, and a DS connecting a plurality of APs. Meanwhile, the IBSS does not include an AP, so all the STAs are mobile stations. Not allowing an access to the DS, the IBSS establishes a self-contained network. The embodiments of the present invention have no connection with the IBSS.

The STA is an arbitrary function medium including a medium access control (MAC) that follows IEEE 802.11 standards and a physical layer interface with respect to a wireless medium. In a broad meaning, the STA includes both an AP and a non-AP station. Among them, mobile terminals operated by a user are non-AP stations (STA1, STA3, STA4, STA6, STAT, and STAB), and simply referring to STA may mean a non-AP station. The non-AP STA may be also called by other names such as wireless transmit/receive unit (WTRU), user equipment (UE), mobile station (MS), mobile terminal, mobile subscriber unit, and the like.

The AP is a function entity providing an access to a DS by way of a wireless medium for an STA (i.e., associated station) associated to the AP itself. In the infrastructure BSS including APs, in principle, communications between non-AP STAs are made by way of the APs, but when a direct link is established, the non-AP STAs can directly communicate with each other. The AP may be also called by other names such as centralized controller, base station (BS), node-B, base transceiver system (BTS), site controller, and the like.

The plurality of infrastructure BSSs may be connected via the DS. The plurality of BSSs connected via the DS is called as an extended service set (ESS). STAs included in the ESS may communicate with each other, and the non-AP STAs in one BSS may move to another BSS while communicating seamlessly.

The DS is a mechanism allowing one AP to communicate with another AP, by which the AP may transmit a frame to STAs associated with a BSS managed by the AP itself, transfer a frame to an STA which has moved to a different BSS, or transfer a frame to an external network such as a wired network. There is no restriction in forms or properties of the DS so long as it can provide a certain distributed service defined by IEEE 802.11, so various types and/or characteristics of networks may be employed.

For example, the DS may be a wireless network such as a mesh network or a physical structure (wired network) connecting APs. In the wireless DS, e.g., the mesh network of IEEE 802.11s, an end-to-end delay or throughput is considerably degraded compared to the wired network. And in spite of the same wired network or wireless network, each DS may have a certain difference in a supported data transfer rate or bandwidth.

Such difference (i.e., whether a DS is a wireless network or a wired network, or DS information such as a supported maximum data transfer rate or used bandwidth) does not matter when the UE uses only a service within the same BSS. However, when the UE wants to use a service of the ESS or a service provided through interworking with an external network, the UE needs to select an AP to be associated in consideration of the DS information. In particular, a hotspot includes a large number of APs, increasing the necessity for the UE to acquire DS information of each AP.

In an embodiment of the present invention, DS information is added to a beacon frame used in a passive scanning method or to a probe request frame and/or probe response frame used in an active scanning method. The DS information may be referred to as various information about a DS, i.e., DS type information as to whether the DS is a wired network or a wireless network such as a mesh network, information about a maximum data transfer rate supported by the DS, a used bandwidth, and the like. Such DS information may be included in a field included in the beacon frame, the probe request frame, and/or probe response frame, or in an information element (IE), and the like. There is no restriction in expressing the DS information. For example, the DS information may be expressed in a bit-field form indicating whether or not it is supported, or a form indicating a maximum and/or minimum supportable value.

Figure 2:
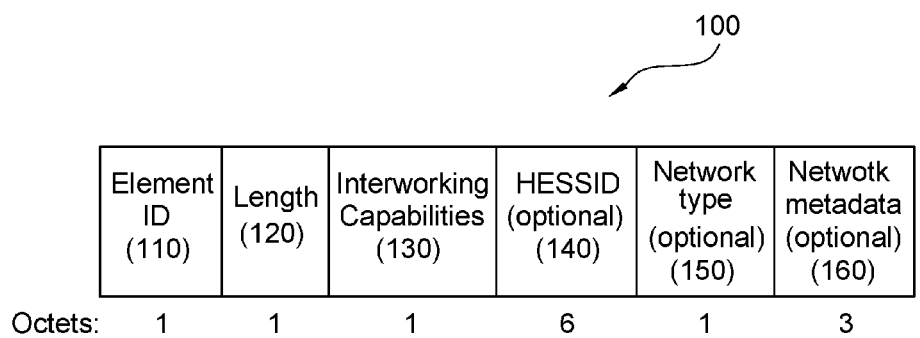
FIG. 2 is a schematic block diagram illustrating the format of an interworking information element, an example of information element (IE) possibly including DS information.

FIG. 2 is a schematic block diagram illustrating the format of an interworking information element, an example of information element (IE) in which DS information may be included. The interworking IE is one of IEs included in a transmission frame in the scanning method that follows IEEE 802.11u. Thus, the interworking IE may be included in a beacon frame, a probe request frame, and/or probe response frame used for the scanning method of the IEEE 802.11u.

With reference to FIG. 2, the interworking IE 100, carrying (holding, including) information about interworking service capabilities of an STA, includes fields of Element ID field 110, Length field 120, Interworking capabilities field 130, HESSID (Homogenous ESS Identifier) field 140, Network type field 150, and Network metadata field 160.

The Element ID field 110 is set by a value indicating an interworking IE. The Length field 120 indicates the length of the Interworking capabilities field 130. In case of non-AP STA, the Length field 120 has a value 1. In case of AP, the value of the Length field 120 may be 5 or 11, which varies depending on whether or not the HESSID field 140 is included.

Figure 3:
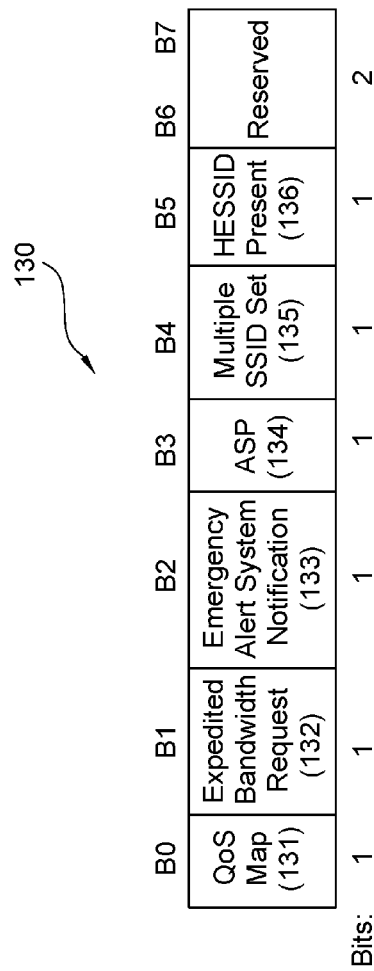
FIG. 3 is a schematic block diagram illustrating the format of an interworking capability field included in the interworking IE field of FIG. 2.

The Interworking Capabilities field 130 is a bit field indicating capabilities related to an interworking service to be informed by an STA. FIG. 3 shows a format of the interworking capabilities field 130. With reference to FIG. 3, the Interworking Capabilities field 130 includes a QoS Map (service capabilities bit) 131, an Expedited Bandwidth Request bit 132, an Emergency Alert System Notification bit 133, an Active Scan Protection (ASP) bit 134, a multiple SSID Set bit 135, and an HESSID Present bit 136.

With reference to FIG. 2, the HESSID field 140, which is to specify a value of the HESSID, is an arbitrary field whose presence varies depending on whether or not the HESSID present field 136 is set in the Interworking Capabilities field 130. A non-AP STA uses the HESSID field 140 in order to indicate a HESSID in the active scanning method.

Figure 4:
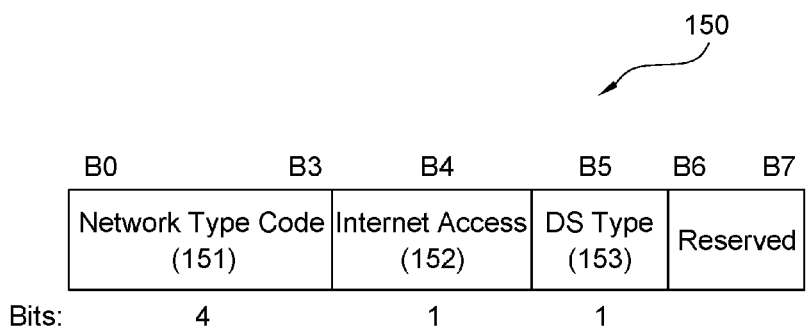
FIG. 4 is a schematic block diagram showing the format of a network type field included in the interworking IE field of FIG. 2 according to an embodiment of the present invention.

The Network type field 150 informs about a network type that can be provided by itself. The Network type field 150 may be also used to indicate information regarding a network type by the non-AP STA in the active scanning method. In an embodiment of the present invention, the Network type field 150 includes an arbitrary field, e.g., a DS information field, to indicate information regarding a DS. The DS information field includes information about a DS type indicating whether the DS is a wired network or a wireless network. Also, the DS information field may further include information about a maximum data transfer rate supported by the DS and/or information about a bandwidth used in the DS. FIG. 4 shows an example of the format of the Network type field 150 including such DS information subfield according to an embodiment of the present invention. With reference to FIG. 4, the Network type field 150 includes a Network Type Code subfield 151, an Internet Access subfield 152, and a DS Type subfield 153. The DS Type subfield 153, which is to indicate whether the DS is a wireless network or a wired network, is an example of the DS information. Thus, the Network type field 150 may further include another subfield for including information about the DS.

The Network Type Code subfield 151 may be used to indicate a network type by the non-AP STA in the active scanning method or may be used to inform about a network that can be provided in the scanning method. Table 1 below shows an example of the network type codes that may be included in the Network Type Code subfield 151.

TABLE 1

| Network Type Code Bits (B0-B3) | Meaning | Description |
|---|---|---|
| 0x0 | Private network | Non-authorized users are not permitted on this network. Examples of this network type are home networks and enterprise networks, which may employ user accounts. These networks may or may not employ encryption. |
| 0x1 | Private network with guest access | Private network but guest accounts area available. If more than 1 SSID is on the BSSID, then one or more guest SSIDs may be identified via their Network Metadata field. |
| 0x2 | Chargeable public network | The network is accessible to anyone, however, access to the network requires payment. Further information on types of charges may be available through other methods (802.21, http or https redirect). |
| 0x3 | Free public network | The network is accessible to anyone and no charges apply for the network use. |
| 0x4 | Emergency network | The network supports Emergency Services. Further information is available from a GAS native query (see 7.3.3) |
| 0x5 to 0xE | Reserved | Not used. |
| 0xF | Reserved | Reserved for wildcard network type |

The Internet Access subfield 152 is set as 1 if one or more SSIDs of a corresponding BSSID have an Internet/Intranet bit set as 1 in the Network metadata field 160. If all the SSIDs of the corresponding BSSID have an Internet/Intranet bit set as 0 in the Network metadata field 160, the Internet Access subfield 152 is set as 0.

With reference to FIG. 4, the DS Type subfield 153 of the Network Type field 150 is an example of information about a DS, indicating whether the DS is a wired network or a wireless network such as a mesh network. For example, if the DS is a wired network, the DS Type subfield 153 may be set as 1. If the DS is a wireless network, the DS Type subfield 153 may be set as 0.

The Network Type field 150 including the DS Type subfield 153 may be included in a beacon frame or in a probe request frame or probe response frame. Thus, by using the frame including the DS Type subfield 153 according to the embodiment of the present invention, the non-AP STA can specify a DS type to be associated and transmit a probe request frame in the active scanning method. When an AP receives the probe request frame including the DS Type subfield 153, the AP may transmit a probe response frame only when a DS connected to the AP corresponds to the DS type specified by the received probe request frame. When the DS Type subfield 153 is included in the beacon frame or probe response frame, the non-AP STA can be selectively associated with an AP suitable for its DS type among candidate APs obtained in the scanning method.

According to the embodiment of the present invention, when the UE receives the beacon frame or the probe response frame in the passive scanning method, it can selectively access a suitable AP by using DS information included in the interworking IE 150 of the received frame or by using DS information included in other IE or field of the received frame. When the UE uses the active scanning method, it can exchange the probe request frame and the probe response frame, and select and access a suitable AP by using DS information included in the interworking IE 150 of the frame or by using DS information included in other IE or field of the received frame.

According to the information acquired or requested by the UE in the related art scanning method, the UE cannot acquire nor specify information about a DS to which an AP is connected. When there are several APs that the UE can access, the UE cannot specify information about a DS to which the APs are connected or cannot recognize the information by using a received frame. That is, because the UE cannot recognize whether a corresponding AP is a mesh AP (MAP) or an AP connected to a wired network, it inevitably accesses an AP at random. However, according to embodiments of the present invention, the UE can specify in advance information about a DS to which an AP to access by the UE itself in the scanning method or may be selectively associated to an AP connected to a type of DS. Thus, the UE can select more suitable AP by using the information about the DS to which the AP is connected.

Embodiments of the subject matter and the functional operations described in this specification can be implemented in a wireless apparatus. The wireless apparatus may be a part of a UE or AP.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method of acquiring network information, performed by a station, in a wireless local area network (WLAN), the method comprising:

transmitting a probe request frame to an access point, the probe request frame including a Homogeneous Extended Basic Service Set ID (HESSID) field and a network type field, the HESSID field including a HESSID desired by the station, the network type field including a network type desired by the station;

receiving a probe response frame from the access point, the probe response frame being transmitted when the network type of the network type field is matched with a network type of the access point and the HESSID of the HESSID field in the probe request frame is matched with a HESSID of the access point, the probe response frame comprises the HESSID field and the network type field;

transmitting a request frame to the access point, the request frame including a request for information about a link connecting the WLAN and another network; and receiving a response frame from the access point in response to the request frame, the response frame including the information about the link, wherein the information about the link comprises a field indicating a speed of the link that is used to connect the WLAN and the another network.

2. The method of claim 1, wherein the network type desired by the station or the network type of the access point is one among a private network, a private network with guest access, a chargeable public network, a free public network, and an emergency network.

3. The method of claim 2, wherein the probe request frame further comprises an indication bit set to '1' for indicating that information related to the HESSID field is included in the probe request frame.

4. The method of claim 1, wherein the link is a distribution system.

5. The method of claim 1, wherein the station is not associated with the access point.

6. A wireless apparatus comprising:
a radio frequency unit configured to transmit and receive a signal; and
a processor coupled to the radio frequency unit and configured to:
transmit a probe request frame to an access point, the probe request frame including a Homogeneous Extended Basic Service Set ID (HESSID) field and a network type field, the HESSID field including a HESSID desired by the wireless apparatus and the HESSID of the HESSID field in the probe request frame is matched with a HESSID of the access point, the network type field including a network type desired by the wireless apparatus,
receive a probe response frame from the access point, the probe response frame being transmitted when the network type of the network type field is matched with a network type of the access point, the probe response frame comprises the HESSID field and the network type field,
transmit a request frame to the access point, the request frame including a request for information about a link connecting the WLAN and another network, and
receive a response frame from the access point in response to the request frame, the response frame including the information about the link,
wherein the information about the link comprises a field indicating a speed of the link that is used to connect the WLAN and the another network.

7. The wireless apparatus of claim 6, wherein the network type desired by the station or the network type of the access point is one among a private network, a private network with guest access, a chargeable public network, a free public network, and an emergency network.

8. The wireless apparatus of claim 7 wherein the probe request frame further comprises an indication bit set to '1' for indicating that information related to the HESSID field is included in the probe request frame.

* * * * *